(12) United States Patent
Kozel et al.

(10) Patent No.: US 11,581,712 B2
(45) Date of Patent: Feb. 14, 2023

(54) ROBOT FOR UNMANNED OPERATION AND MAINTENANCE IN AN INDOOR MEDIUM OR HIGH VOLTAGE SWITCH-GEAR STATION

(71) Applicant: ABB Schweiz AG, Baden (CH)

(72) Inventors: Tomas Kozel, Brno (CZ); Thomas Schmidtchen, Houston, TX (US); Martin Stefanka, Rajhrad (CZ)

(73) Assignee: ABB Schweiz AG, Baden (CH)

( * ) Notice: Subject to any disclaimer, the term of this patent is extended or adjusted under 35 U.S.C. 154(b) by 266 days.

(21) Appl. No.: 16/727,996

(22) Filed: Dec. 27, 2019

(65) Prior Publication Data
US 2020/0153210 A1 May 14, 2020

Related U.S. Application Data

(63) Continuation of application No. PCT/EP2018/066951, filed on Jun. 25, 2018.

(30) Foreign Application Priority Data

Jun. 28, 2017 (EP) ..................... 17178336
Dec. 21, 2017 (EP) ..................... 17209473

(51) Int. Cl.
*B25J 19/04* (2006.01)
*H02B 3/00* (2006.01)
(Continued)

(52) U.S. Cl.
CPC .............. *H02B 3/00* (2013.01); *B25J 11/005* (2013.01); *B25J 19/04* (2013.01); *H02B 13/00* (2013.01)

(58) Field of Classification Search
CPC ......... B25J 19/04; B25J 11/005; H02B 13/00; H02B 3/00; H02B 7/00; H04N 5/9201;
(Continued)

(56) References Cited

U.S. PATENT DOCUMENTS 7,576,985 B2  8/2009 Kingston
8,878,687 B2  11/2014 Ikeda et al.
(Continued)

FOREIGN PATENT DOCUMENTS

CN  101303695 A  11/2008
CN  101604825 A  12/2009
(Continued)

OTHER PUBLICATIONS

Medendez et al., Robotics in Power Systems: Enabling a More Reliable and Safe Grid, 2017, IEEE, p. 22-34 (Year: 2017).*
(Continued)

*Primary Examiner* — McDieunel Marc
(74) *Attorney, Agent, or Firm* — Leydig, Voit & Mayer, Ltd.

(57) ABSTRACT

A switch-gear or control-gear system for medium or high voltage use includes an external housing containing the switch-gear or control-gear system, which is configured for unmanned operation and maintenance. The switch-gear or control-gear system is configured for unmanned operation and maintenance with a robotic system or manipulator and the robotic system or manipulator is provided with a camera system and an image recognition system. The robotic system is provided with a data network or an external data communication interface.

19 Claims, 1 Drawing Sheet

(51) Int. Cl.
*B25J 11/00* (2006.01)
*H02B 13/00* (2006.01)

(58) Field of Classification Search
CPC .... H04N 5/772; H04N 7/0125; H04N 9/8205; H04N 5/76; H04N 5/781; H04N 5/9206; H04N 5/2628; H04N 5/77; H04N 9/8233; H04N 5/9205; H04N 5/7605; H04N 5/9202; H04N 5/91; H04N 7/015; G11B 27/28; G11B 27/34; G11B 27/036; G11B 31/006
See application file for complete search history.

(56) References Cited

U.S. PATENT DOCUMENTS

| | | | |
|---|---|---|---|
| 10,744,124 B2* | 8/2020 | Zaid | A61K 31/11 |
| 10,751,330 B2* | 8/2020 | Zaid | A61K 31/12 |
| 2004/0176875 A1* | 9/2004 | Iribe | B62D 57/032 |
| | | | 318/568.12 |
| 2011/0067781 A1 | 3/2011 | Osborne | |
| 2013/0231779 A1 | 9/2013 | Purkayastha et al. | |
| 2015/0364285 A1 | 12/2015 | Shinde et al. | |
| 2017/0085064 A1 | 3/2017 | Cassimere et al. | |
| 2020/0127446 A1 | 4/2020 | Kozel et al. | |
| 2020/0127447 A1 | 4/2020 | Kozel et al. | |
| 2020/0127448 A1* | 4/2020 | Kozel | H02B 7/00 |
| 2020/0136357 A1 | 4/2020 | Kozel et al. | |
| 2020/0136358 A1 | 4/2020 | Kozel et al. | |
| 2020/0147061 A1* | 5/2020 | Zaid | A61K 47/10 |
| 2020/0265572 A1 | 8/2020 | Cole et al. | |

FOREIGN PATENT DOCUMENTS

| | | |
|---|---|---|
| CN | 101692530 A | 4/2010 |
| CN | 102056581 A | 5/2011 |
| CN | 102122844 A | 7/2011 |
| CN | 102280826 A | 12/2011 |
| CN | 202333477 U | 7/2012 |
| CN | 102856827 A | 1/2013 |
| CN | 202649815 U | 1/2013 |
| CN | 202678813 U | 1/2013 |
| CN | 203660309 U | 6/2014 |
| CN | 203788404 U | 8/2014 |
| CN | 104144325 A | 11/2014 |
| CN | 204012372 U | 12/2014 |
| CN | 104569912 A | 4/2015 |
| CN | 104660948 A | 5/2015 |
| CN | 205021584 U | 2/2016 |
| CN | 105415380 A | 3/2016 |
| CN | 205206469 U | 5/2016 |
| CN | 205380658 U | 7/2016 |
| CN | 105881505 A | 8/2016 |
| CN | 105958344 A | 9/2016 |
| CN | 106003084 A | 10/2016 |
| CN | 106165048 A | 11/2016 |
| CN | 106223775 A | 12/2016 |
| CN | 106340006 A | 1/2017 |
| CN | 205944755 U | 2/2017 |
| CN | 106647569 A | 5/2017 |
| CN | 106856311 A | 6/2017 |
| EP | 3010101 A1 | 4/2016 |
| GB | 1524109 A | 9/1978 |
| JP | H 06233419 A | 8/1994 |
| JP | H 09130929 A | 5/1997 |
| JP | 2007-172735 A | 7/2007 |
| KR | 10-1608325 B1 | 4/2016 |
| WO | 2015081455 A1 | 6/2015 |

OTHER PUBLICATIONS

Lu et al., Mobile robot for power substation inspection: a survey, 2017, IEEE, p. 830-847 (Year: 2017).*
Velrajkumar et al., Development of real-time tracking and control mobile robot using video capturing feature for unmanned applications, 2010, IEEE, p. (Year: 2010).*
Toth et al., Smart view for a smart grid—Unmanned Aerial Vehicles for transmission lines, 2010, IEEE, p. 1-6 (Year: 2010).*
Allen et al., Robotic Systems Applied to Power Substations—A State-of-the-Art Survey, 2014, IEEE, p. 1-6 (Year: 2014).*
Debenest et al., Expliner—Robot for Inspection of Transmission Lines, 2008, IEEE, p. 3978-3984 (Year: 2008).*
Luan et al., A Robot Used for Partial Discharge Detection of Switchgear, 2017, IEEE, p. 823-827 (Year: 2017).*
Yan et al., A Real-Time IR-Fusion Switchgear Contact Monitoring System (SCMS), 2017, IEEE, p. 12114-12124 (Year: 2017).*
Jean-Francois Allan et al: "Robotic systems applied to power substations—A state-of-the-art survey", Proceedings of the 2014 3$^{rd}$ International Conference on Applied Robotics for the Power Industry, Jan. 1, 2014 (Jan. 1, 2014), pp. 1-6, XP055471456.
Terence Hazel et al: "IEC switchgear & controlgear—internal arc withstand a designer's and user's view", PCIC Europe 2013, Jun. 1, 2011 (Jun. 1, 2011), pp. 1-12, XP055514149.
Chen, "Electrical Design Manual for Intelligent Building," *China Building Materials Industry Press*, Book 2, 1115-1119 (Aug. 1999).
Li et al., "Industrial Robot Installation and Commissioning Tutorial," Textbook for Industrial Robot Professionals under the 13th Five-Year Plan, *Beihang Univ. Press*, Beijing, China, 26 pp. (Nov. 2016).
Liu et al., "Robotics Fundamentals," *Metallurgical Industry Press*, Beijing, China, 43 pp. (Nov. 2002).
U.S. Appl. No. 16/724,462, filed Dec. 23, 2019, Pending.
U.S. Appl. No. 16/724,479, filed Dec. 23, 2019, Pending.
U.S. Appl. No. 16/724,499, filed Dec. 23, 2019, Pending.
U.S. Appl. No. 16/727,982, filed Dec. 27, 2019, Patented.

* cited by examiner

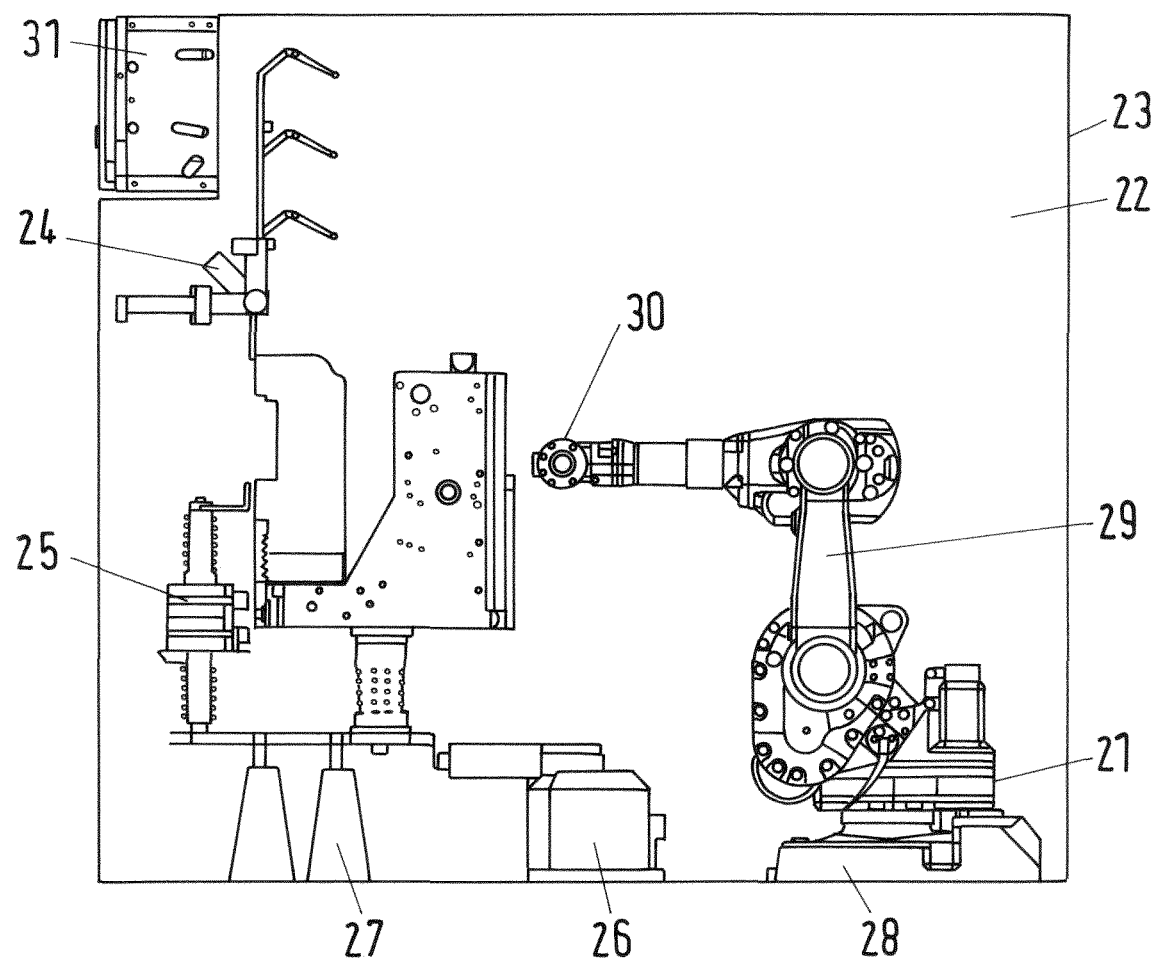

ROBOT FOR UNMANNED OPERATION AND MAINTENANCE IN AN INDOOR MEDIUM OR HIGH VOLTAGE SWITCH-GEAR STATION

CROSS-REFERENCE TO PRIOR APPLICATIONS

This application is a continuation of International Patent Application No. PCT/EP2018/066951, filed on Jun. 25, 2018, which claims priority to European Patent Application Nos. EP 17178336.8, filed on Jun. 28, 2017 and to EP 17209473.2, filed on Dec. 21, 2017. The entire disclosures of all three applications is hereby incorporated by reference herein.

FIELD

The invention relates to a switch or control-gear system that can be for medium or high voltage use.

BACKGROUND

Normally, well known switch-gears or control-gears are provided with sensors, in order to have control elements and sensors, connected via local data networks or via browsers, for technical diagnostic and steering functions and or maintenance.

The scope of the inspection in switch-gear or control-gear with unmanned operation can be enhanced compared to the scope that is typically done by fixed sensors or manually on de-energized switch-gear or control-gear today. By enhancing the inspection scope periodic shutdown and testing of the switch-gear or control-gear and its components can be avoided.

Systems like that, only can send sensor data for technical diagnosis, but maintenance of actual technical problems cannot be activated.

SUMMARY

In an embodiment, the present invention provides a switch-gear or control-gear system for medium or high voltage use including an external housing containing the switch-gear or control-gear system, which is configured for unmanned operation and maintenance. The switch-gear or control-gear system is configured for unmanned operation and maintenance with a robotic system or manipulator and the robotic system or manipulator is provided with a camera system and an image recognition system.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 is a cross-section of switch-gear or control-gear with unmanned operation and maintenance, according to an embodiment.

DETAILED DESCRIPTION

An object of an embodiment of the invention is, to enhance such switch-gear or control-gear systems, as well as the method for operating the same as such, that a more detailed sensing of technical faults is given, so that faults or deterioration of components that might lead to faults, and malfunctions can be located much more detailed and quickly, and at least first steps, over solving technical problems can be initiated automatically.

Considering that, a switch-gear or control-gear with unmanned operation and maintenance excludes human operators from operation and maintenance processes of the switch-gear or control-gear as we know them today.

Referring to a switch-gear or control-gear system, an embodiment of the invention is, that the switch-gear or control-gear system is provided for unmanned operation and maintenance with a robotic system or manipulator, and that the robotic system or manipulator is provided with a camera system, and an image recognition system.

By adding a robotic system to inner space of the switch-gear or control-gear, a new system serving the operation and maintenance functions of the switch-gear or control-gear was introduced. The robotic system and design of the switch-gear or control-gear internal space without segregations gives opportunity to collect much richer static and dynamic visual data about the primary and auxiliary circuits and mechanisms condition compared to today situation.

Collected rich visual data allow the application of automatized image processing and analysis with the target to learn the conditions of the switch-gear or control-gear systems and components.

Furthermore, by the use of the invention, the switch-gear or control-gear systems can react in cases of faults much quicker, and more effectively.

A further advantageous embodiment is that the robot system is provided with a data network or an external data communication interface.

In a further advantageous embodiment, the camera has means for corresponding with an image recognition system, and to evaluate actual images with adaptive image data, in order to be able to locate and to analyse physical reasons for faults, or deterioration of components, that might lead to faults.

In a further advantageous embodiment, the camera is provided with a video mode, by which the functional surveillance can be taken by slow motion video sequences.

Concerning to a method for operating such a switch-gear or control-gear, the invention is, that the switch-gear or control-gear system is provided for unmanned operation and maintenance with a robotic system or manipulator, which is steered at least partly by a housing internal or a housing external software system, and that the robotic system or manipulator is provided with a camera system, and an image recognition system, which is corresponding for technical diagnosis. In a further advantageous embodiment of the invention, the robot system is provided with a data network or external data communication interface, and that in case of detection of technical problems or malfunctions, referring messages are generated automatically and sent to an authorized external observation system.

Furthermore advantageous is an embodiment, in which the camera is provided with means for corresponding with an image recognition system, and to evaluate actual images with adaptive image data, in order to be able to locate and to analyse physical reasons for faults or deterioration of components that might lead to faults.

In an advantageous embodiment, the camera is provided with a video mode, by which the functional surveillance can be taken by slow motion video sequences, and analysed automatically with regular expected function sequences by comparison of slow motion video sequences from an adaptive data field, which show the expected regular function.

An advantageous embodiment of the invention is shown in FIG. 1, which depicts an example cross-section of a switch-gear or control with unmanned operation and maintenance.

In an embodiment, the present invention describes the enhanced scope of robotized inspection of the switch-gear or control-gear with unmanned operation and maintenance.

The robotic system 21 tooling includes in this embodiment sensors for visual inspection and thermographic inspection for the enhanced inspection of energized switch-gear or control-gear. As the robotic manipulator 29 and wrist 30 is allowed to approach de-energized circuits only, all these sensors shall be non-contact type. The robotic arm and wrist can position the sensors to best shot positions without advanced pan, tilt, zoom functions on the sensors itself.

The visual inspection sensor in this embodiment is be capable of taking high resolution picture as well as slow-motion video sequence recording. The data from visual inspection sensor and subsequent automatic image analysis algorithms shall be used for following inspection tasks:

Detecting grime, corrosion, moisture on the primary circuits from high resolution static images Detecting traces of discharges or ruptures on the insulation surfaces from high resolution static images Detecting irregularities in movement of auxiliary mechanism during operation by slow-motion video sequence analysis Detecting irregularities in movement of switching device moving contact by slow-motion video sequence analysis The sensors for thermographic inspection shall be capable of taking high resolution thermographic pictures of high emissivity surfaces. The primary circuits inside the switch-gear or control-gear are preferably, in an embodiment, covered with thin high emissivity material wherever possible to allow accurate thermographic measurements.

The data from thermographic inspection sensor and subsequent automatic image analysis algorithms are, in an embodiment, used for following inspection tasks:

Detecting hot spots on primary circuits from static thermographic images—Detecting spots hotter than maximum allowed temperature on the primary circuits from static thermographic images Detecting hot spots on the auxiliary circuits from static thermography images Detecting points of high friction on the auxiliary mechanisms from static thermography images While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for medium or high voltage use, the system being a switch-gear or a control gear, the system comprising:
an external housing containing the system, which is configured for unmanned operation and maintenance, wherein the system is configured for unmanned operation and maintenance with a robotic system or manipulator and that the robotic system or manipulator is provided with a camera system and an image recognition system.

2. The system according to claim 1, wherein the robot system is provided with a data network or an external data communication interface.

3. The system according to claim 1, wherein the camera is configured to correspond with an image recognition system and to evaluate actual images with adaptive image data, in order to be able to locate and to analyse physical reasons for faults or deterioration of components that might lead to faults.

4. The system according to claim 1, wherein the camera is provided with a video mode, by which the functional surveillance can be taken by slow motion video sequences.

5. The method according to claim 1, wherein the camera is provided with a video mode, by which the functional surveillance can be taken by slow motion video sequences, and analysed automatically with regular expected function sequences by comparison of slow motion video sequences from an adaptive data field, which show the expected regular function.

6. A method for operating a system for medium or high voltage use comprising an external housing containing the system, which is configured for unmanned operation and maintenance,
wherein the system is configured for unmanned operation and maintenance with a robotic system or manipulator, which is steered at least partly by a housing internal or a housing external software system and the robotic system or manipulator is provided with a camera system and an image recognition system, which is used for technical diagnosis.

7. The method according to claim 6, wherein the robot system is provided with a data network or external data communication interface, and that in case of detection of technical problems or malfunctions, referring messages are generated automatically and send to an authorized external observation system.

8. The method according to claim 6, wherein the camera is configured to correspond with an image recognition system and to evaluate actual images with adaptive image data, in order to be able to locate and to analyse physical reasons for faults.

9. An electrical device, comprising:
at least one member of a group consisting of medium voltage switchgear, a high voltage switchgear, a medium voltage control gear, and high voltage control gear, the at least one switchgear or control gear comprising:
an unmanned robotic system;
a housing;
primary circuits;
primary mechanisms;
a switching device with a moving contact;
auxiliary circuits; and
auxiliary mechanisms,
wherein the robotic system is located within the housing,
wherein the primary circuits, the primary mechanisms, the switching device with the moving contact, the auxiliary circuits, and the auxiliary mechanisms are located within the housing,
wherein the robotic system comprises:
a robotic arm with a wrist;
a camera system; and
an image recognition system,
wherein the camera system is attached to the robotic arm with the wrist,
wherein the robotic arm with the wrist is configured to position the camera system at a plurality of locations within an inner space of the at least one switchgear or control gear,
wherein at the plurality of locations the camera system is configured to acquire imagery of the primary circuits, the primary mechanisms, the switching device with the moving contact, the auxiliary circuits, and the auxiliary mechanisms,
wherein the imagery is visual imagery acquired with a visual inspection sensor of the camera system and/or thermographic imagery acquired with a thermographic inspection sensor of the camera system, and
wherein the image recognition system is configured to implement at least one image analysis algorithm to analyze imagery to determine a condition of one or more of the primary circuits, the primary mechanisms, the switching device with the moving contact, the auxiliary circuits, and the auxiliary mechanisms.

10. The electrical device according to claim 9, wherein:
the imagery comprises the visual imagery,
the visual imagery comprises one or more high resolution static images, and
wherein the determined condition of the one or more primary circuits comprises a detection of one or more of: grime, corrosion, and moisture on one or more primary circuits from an analysis of the one or more high resolution static images.

11. The electrical device according to claim 9, wherein:
one or more of the primary circuits, the primary mechanisms, the switching device with the moving contact, the auxiliary circuits, and the auxiliary mechanisms comprises insulation,
the imagery comprises the visual imagery,
the visual imagery comprises one or more high resolution static images, and
the determined condition of the primary circuits, the primary mechanisms, the switching device with the moving contact, the auxiliary circuits, and the auxiliary mechanisms comprises a detection of one or more discharges or ruptures on an insulation surface from an analysis of the one or more high resolution static images.

12. The electrical device according to claim 9, wherein:
the imagery comprises the visual imagery,
the visual imagery comprises one or more slow-motion video sequences, and
the determined condition of the auxiliary mechanisms comprises a detection of an irregularity in movement of at least one of the auxiliary mechanism from an analysis of the one or more slow-motion video sequences.

13. The electrical device according to claim 9, wherein:
the imagery comprises the visual imagery,
the visual imagery comprises one or more slow-motion video sequences, and
the determined condition of the switching device with the moving contact comprises a detection of an irregularity in movement of the moving contact from an analysis of the one or more slow-motion video sequences.

14. The electrical device according to claim 9, wherein:
the imagery comprises the thermographic imagery,
the thermographic imagery comprises one or more high resolution static thermographic images, and
the determined condition of the primary circuits comprises a detection of a hot spot on one or more of the primary circuits from an analysis of the one or more high resolution static thermographic images.

15. The electrical device according to claim 14, wherein the image recognition system is configured to determine that a spot is the hot spot when a detected temperature of the spot is greater than an allowed maximum temperature.

16. The electrical device according to claim 14, wherein at least some parts of the primary circuits are covered with a thin high emissivity material.

17. The electrical device according to claim 9, wherein:
the imagery comprises the thermographic imagery,
the thermographic imagery comprises one or more high resolution static thermographic images, and
the determined condition of the auxiliary circuits comprises a detection of a hot spot on an auxiliary circuit from an analysis of the one or more high resolution static thermographic images.

18. The electrical device according to claim 9, wherein:
the imagery comprises the thermographic imagery,
the thermographic imagery comprises one or more high resolution static thermographic images, and
the determined condition of the auxiliary mechanisms comprises a detection of a point of high friction on an auxiliary mechanism from an analysis of the one or more high resolution static thermographic images.

19. The electrical device according to claim 9, wherein the robotic system is configured to determine a location associated with the determined condition of the primary circuits and mechanisms, switching device with a moving contact, and auxiliary circuits and mechanisms.

\* \* \* \* \*